United States Patent
Scott

(10) Patent No.: US 9,106,747 B1
(45) Date of Patent: *Aug. 11, 2015

(54) CALL ROUTING TO SUBJECT MATTER SPECIALIST FOR NETWORK PAGE

(71) Applicant: Amazon Technologies, Inc., Reno, NV (US)

(72) Inventor: Sean M. Scott, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,673

(22) Filed: Jul. 15, 2014

Related U.S. Application Data

(63) Continuation of application No. 13/217,364, filed on Aug. 25, 2011, now Pat. No. 8,787,540.

(51) Int. Cl.
*H04M 11/00* (2006.01)
*H04M 3/51* (2006.01)

(52) U.S. Cl.
CPC .................................. *H04M 3/5191* (2013.01)

(58) Field of Classification Search
CPC .... H04M 7/003; H04M 7/006; H04M 3/5233
USPC ................. 379/93.23, 90.01, 265.09, 265.12; 370/352

See application file for complete search history.

(56) References Cited

U.S. PATENT DOCUMENTS

| | | | |
|---|---|---|---|
| 6,981,020 B2 | 12/2005 | Miloslavsky et al. | |
| 7,272,223 B2 | 9/2007 | McCormack et al. | |
| 8,787,540 B1 * | 7/2014 | Scott | 379/93.23 |
| 2007/0067317 A1 * | 3/2007 | Stevenson | 707/100 |
| 2007/0294354 A1 | 12/2007 | Sylvain | |
| 2010/0094878 A1 | 4/2010 | Soroca et al. | |
| 2011/0164610 A1 | 7/2011 | Cabasse et al. | |
| 2011/0179026 A1 | 7/2011 | Mulligen et al. | |
| 2012/0020473 A1 | 1/2012 | Mart et al. | |

* cited by examiner

*Primary Examiner* — Stella Woo
(74) *Attorney, Agent, or Firm* — Thomas | Horstemeyer, LLP

(57) ABSTRACT

Disclosed are various embodiments for location based call routing to a subject matter specialist. A call request is received from a computing device which includes an identifier of a network page. A topic specialist for the network page is identified from the contents of the network page. The call request is completed by establishing a call between the computing device and another computing device which is operated by the topic specialist.

20 Claims, 3 Drawing Sheets

CALL ROUTING TO SUBJECT MATTER SPECIALIST FOR NETWORK PAGE

CROSS-REFERENCE TO RELATED APPLICATIONS

This application is a continuation of and claims the benefit of U.S. patent application Ser. No. 13/217,364, entitled "CALL ROUTING TO SUBJECT MATTER SPECIALIST FOR NETWORK PAGE TOPIC," and filed Aug. 25, 2011, which is hereby incorporated by reference in its entirety.

BACKGROUND

Users who view network pages such as web pages often want additional information about the topics on the network page. For example, a customer viewing an electronic catalog may want additional information about a product. An online merchant may therefore provide a hotline which customers can call to speak to a customer representative. However, the vast number and variety of products offered for sale by online merchants make it difficult for these merchants to staff a hotline with representatives who are knowledgeable about the products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing assistance to users who view network pages such as web pages. More specifically, the present disclosure relates to analyzing a network page to determine the topic of the network page, and routing a phone call from the user to a specialist who can provide assistance on that particular topic. In various embodiments disclosed herein, the user interacts with a contact application to request contact with a specialist. The contact application, acting on behalf of the user, interacts with another computer application or service to request a phone call with a specialist. This remote computer application or service may be implemented, for example, in conjunction with a call center.

The user-side application identifies the network page of interest to the remote application or service. The remote application or service analyzes the content of the network page of interest and determines the topic of the network page. For example, the topic for a network page on an electronic commerce site may be a product or product category. The remote application or service maps the topic to a person with knowledge about that topic. Through the contact application on the computing device, the remote application or service automatically establishes a phone call between the user's computing device and a computing device operated by the topic specialist. The topic specialist is then available to provide assistance to the user on the topic of the network page.

Notably, the topic of each network page is dynamically identified, at the time of the request for assistance. Thus, topic assistance is not limited to a predefined set of network pages, where each network page is statically mapped, a priori, to a topic. Instead, the embodiments described herein allow assistance for a virtually unlimited set of network pages.

Furthermore, the embodiments described herein allow for a business model where various third parties can provide specialized assistance, each on a subset of topics. Thus, one topic assistance entity might be composed of plumbers, while another might be composed of chefs. So, instead of hiring a staff of product specialists who are knowledgeable about a limited set of products, the embodiments disclosed herein allow a business to contract with various topic assistance entities to provide assistance about a wide range of products, services, and other topics. In the following discussion, a general description of the system and its components is provided, followed by a discussion of the operation of the same.

Figure 1:
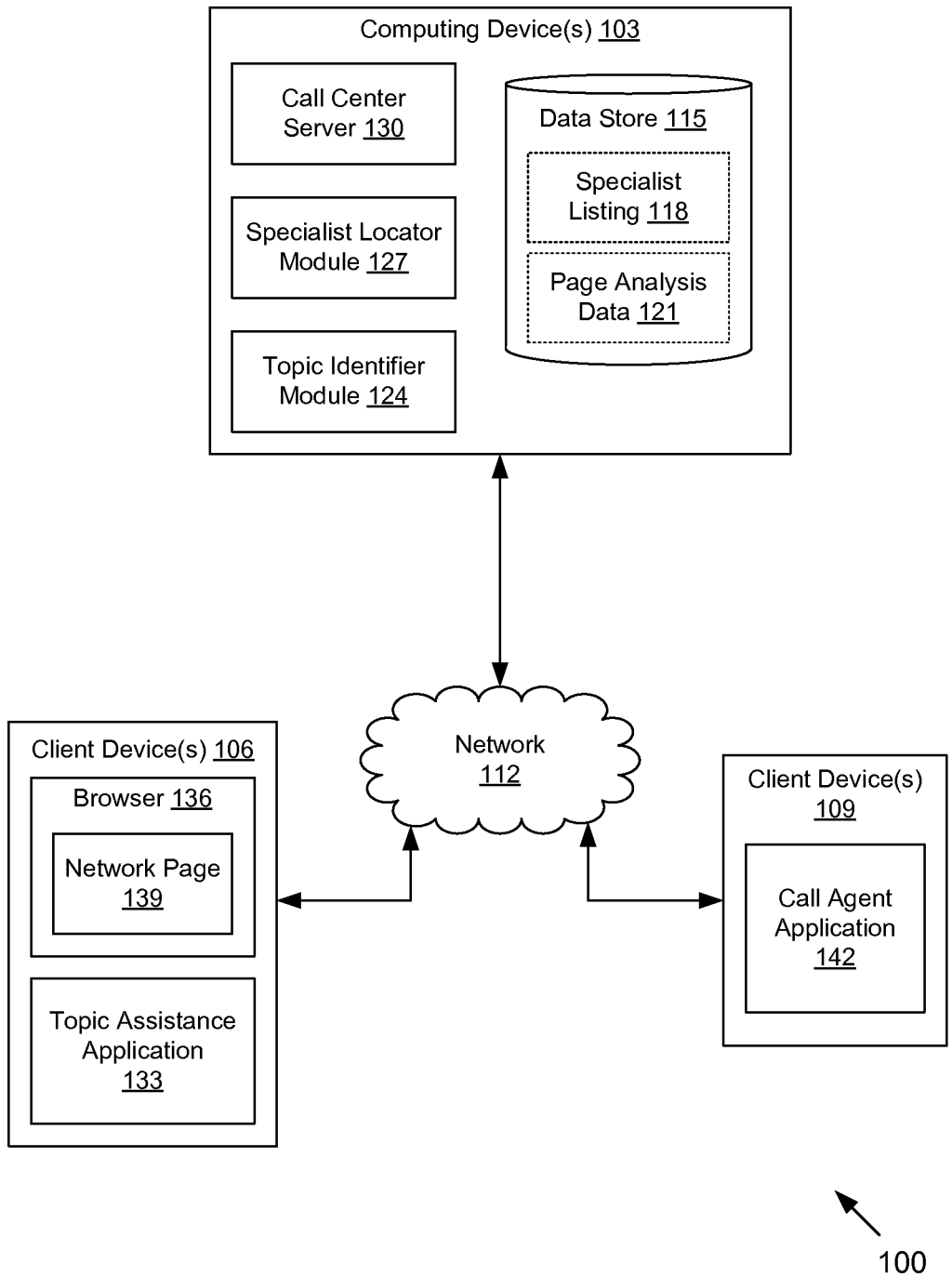
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 and one or more client devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below. The data stored in the data store 115 includes, for example, a specialist listing 118 and page analysis data 121, as well as potentially other data. The specialist listing 118 contains information about persons who specialize in or have expertise in various subject matter or topic areas. Examples of an entry in the specialist listing 118 include a phone number at which the person can be reached, a subject matter or topic area in which the person is knowledgeable, and educational or work experience qualifications of the subject matter specialist. The specialist listing 118 may be implemented as a database, and in such cases may be indexed by topic or by any other suitable field. The page analysis data 121 contains information obtained by analyzing the contents of network pages, such as keywords, relationships between keywords, frequency of keywords, etc.

The components executed on the computing device 103, for example, include a page topic identifier module 124, a specialist locator module 127, and a call center server 130. The page topic identifier module 124 is executed to analyze a network page, such as a web page, and to determine at least one topic of that network page. The page topic identifier module 124 uses previously collected page analysis data 121 in performing this analysis. To gather this page analysis data 121, the page topic identifier module 124 may crawl or traverse network pages stored anywhere on the network 112 and/or on the Internet. The specialist locator module 127 is executed to identify a topic or subject matter specialist, given a topic. The specialist locator module 127 may also be executed to determine a phone number at which the topic specialist can be reached. The call center server 130 is executed to route and connect calls from a client device 106, operated by an end user, to a client device 109, operated by a topic specialist. The topic specialist can thus be viewed as a call agent with respect to the call center server 130.

Calls between customers and topic specialists are carried on a data network such as the network 112. The call center server 130 may utilize features such as automatic call distribution and interactive voice response in the process of routing a call between a mobile customer and a subject matter specialist. In some embodiments, the call center server 130 is implemented using a set of protocols referred to as Voice over Internet Protocol (VoIP). The VoIP protocols may include, but are not limited to, Session Initiation Protocol (SIP), Session Description Protocol (SDP), Real Time Transport Protocol (RTP), Real-time Transport Control Protocol (RTCP), IP Multimedia Subsystem (IMS), Media Gateway Control Protocol (MGCP), and International Telecommunication Union (ITU) H.323.

In various embodiments, the call center server 130 and the specialist locator module 127 may utilize any type of middleware framework to communicate with each other. Similarly, the call center server 130, the specialist locator module 127, and the page topic identifier module 124 may utilize any type of middleware framework to communicate with application executing on a client device 106, such as the topic assistance application 133. Examples of such frameworks include remote procedure calls, service-oriented architecture protocol (SOAP), representational state transfer (REST), Windows Communication Foundation, and other frameworks. Although described herein as separate components, the functionality of the call center server 130, the specialist locator module 127, and the page topic identifier module 124 can also be combined, as should be appreciated.

The client device 106, 109 is representative of a plurality of client devices that may be coupled to the network 112. The client device 106, 109 may comprise, for example, a processor-based system such as a computer system. Such a computer system may be embodied in the form of a desktop computer, a laptop computer, a personal digital assistant, a cellular telephone, a smart phone, a set-top box, a music player, a video player, a media player, a web pad, a tablet computer system, a game console, an electronic book reader, or other devices with like capability.

The client device 106 may be configured to execute various applications such as a topic assistance application 133 and a browser 136. The client device 106 may be configured to execute other applications such as, for example, email applications, instant message applications, navigation applications, and/or other applications. The browser 136 may be executed in a client device 106, for example, to access and render network pages 139 or other network content served up by a network page server application, thereby generating a rendered network page 139. The topic assistance application 133 may be executed in the client device 106 to facilitate a user contacting a topic specialist in order to obtain assistance or more information about a particular topic related to a network page 139. To this end, the topic assistance application 133 may interact with the call center server 130. The topic assistance application 133 may be implemented as a standalone application, may be executed in the context of the browser 136, or may be integrated with the browser 136, as should be appreciated.

The client device 109 may be configured to execute various applications such as a call agent application 142 and/or other applications. The call agent application 142 may be executed in the client device 109 to answer phone calls that originate from customers. To this end, the call agent application 142 may interact with the call center server 130. During the call, the call agent application 142 may provide the topic specialist with information that identifies the topic of the call. The client device 109 may be configured to execute other applications such as, for example, browsers, email applications, instant message applications, navigation applications, and/or other applications.

Next, a general description of the operation of the various components of the networked environment 100 is provided. To begin, a user interacts with the browser 136 executing in a client device 106 to view a network page 139. The user then interacts with the topic assistance application 133 executing in a client device 106 to make a phone call in order to obtain assistance for a particular topic on the network page 139. The customer is not required to identify the topic. Instead, components executing on the computing device 103 determine the topic of interest by analyzing the contents of the network page 139, as described in further detail below. The network page 139 may be the currently rendered page, or may be a previously viewed page. If the call relates to a previously viewed page, the user marks the particular network page 139 in some way to indicate to the topic assistance application 133 which network page 139 is the subject of the phone call.

The topic assistance application 133 then sends a call request, which includes an identifier of the network page 139, to the call center server 130 executing on the computing device 103. The call center server 130 uses the services of the page topic identifier module 124 to identify a topic, or topics, of the network page 139. In some embodiments, the page topic identifier module 124 identifies a single primary topic, and then the call is placed to a specialist for that primary topic. In other embodiments, the page topic identifier module 124 identifies multiple candidate topics, and the user is prompted to select one of the candidate topics before the call goes through to an appropriate topic specialist.

Having identified the page topic, the call center server 130 uses the services of the specialist locator module 127 to find a particular person who has knowledge about the topic. The call center server 130 then fulfills the customer's request for assistance by routing the phone call to the identified specialist. The topic may be an item such as a product or product category, so that the topic specialist can be viewed as an item specialist or product specialist. The network page 139 which is the subject of the call is part of a network site operated by a particular entity or business, as should be appreciated. Thus, the topic specialist returned by the specialist locator module 127 may be an employee of the entity operating the network site. However, this is not a requirement, and the topic specialist returned by the specialist locator module 127 may be a third party provider. The embodiments disclosed herein thus allow a user to obtain assistance from a virtually unlimited number of topic specialists.

Once the call between the mobile user and the topic specialist is established, the call proceeds in the conventional fashion. The phone call may include audio, video, multimedia, or a combination thereof. The video portion of the call may utilize a camera or other video capture device located in the client device 106. The call may include, or be associated with, data other than audio or video. For example, the topic specialist may send data to the client device 106, for example in the form of a network page. In this manner, the topic specialist can provide information about a product during the call.

Figure 2:
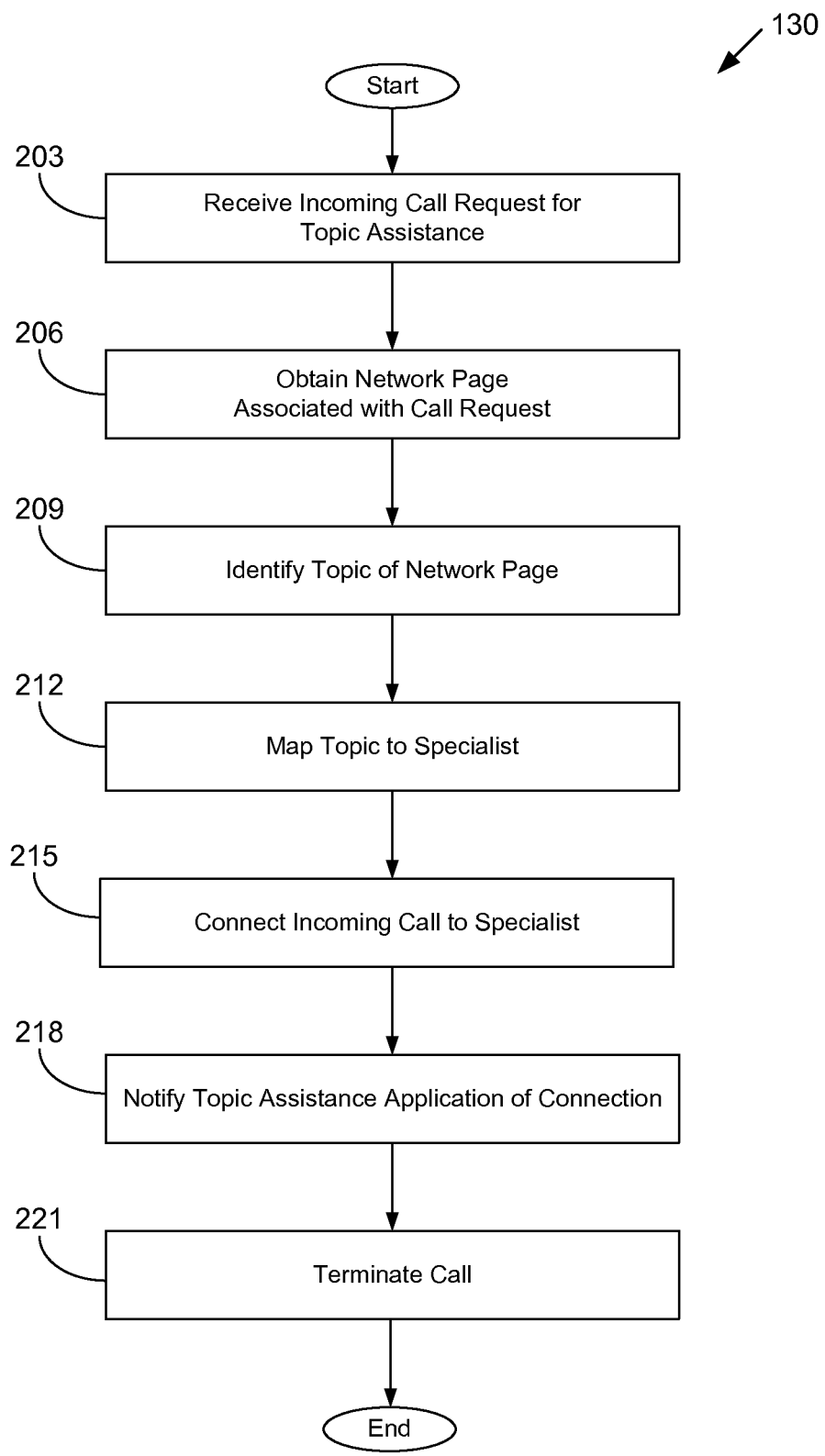
FIG. 2 is a flowchart illustrating another example of functionality implemented as portions of a call center server executed in a computing device in the networked environment of FIG. 1 according to various embodiments of the present disclosure.

With reference now to FIG. 2, shown is a flowchart that provides one example of the operation of a portion of the call center server 130 executing on the computing device 103 according to various embodiments. It is understood that the flowchart of FIG. 2 provides merely an example of the many different types of functional arrangements that may be employed to implement the operation of the portion of the call center server 130 as described herein. As an alternative, the flowchart of FIG. 2 may be viewed as depicting an example of steps of a method implemented in the computing device 103 (FIG. 1) according to one or more embodiments.

Beginning at box 203, the call center server 130 receives an incoming call request from the topic assistance application 133 executing on a client device 106. The call center server 130 may support various types of calls, as should be appreciated. For example, the call may include a voice channel, a video channel, a data channel, and/or other channels. The call request includes an identifier of a particular network page 139 on the client device 106. The identifier may be, for example, a uniform resource locator (URL) or a uniform resource identifier (URI).

Next, at box 206, the call center server 130 uses the page identifier in the call request to retrieve the corresponding network page 139. The location of the network page 139 is not limited to local storage of the computing device 103. Instead, the network page 139 referenced in the call request may be stored in any location that is accessible to the call center server 130, for example, through the network 112. Since the network 112 may be interconnected with the Internet, the network page 139 retrieved at box 206 could reside anywhere in the world. In this manner, the user that is interacting with the topic assistance application 133 can obtain topic assistance for a virtually unlimited number of network pages 139.

At box 209, the call center server 130 uses the services of the page topic identifier module 124 to dynamically identify the topic of the network page 139. The page topic identifier module 124 performs semantic analysis on the content of the network page 139 to identify one or more keywords on the page. The page topic identifier module 124 uses data collected from previous analysis of network pages, stored as page analysis data 121. However, the page analysis data 121 is not limited to data derived from network pages, but may also include a priori data, for example, an ontology describing a set of concepts within a domain, and the relationships between those concepts.

As should be appreciated, the semantic analysis performed at box 209 may use various known techniques (e.g., those used by search engines) to identify words and phrases with in the page, and then to determine which words or phrases are important enough to be considered keywords. The page topic identifier module 124 then determines the topic of the network page 139 from these keywords. The page topic identifier module 124 may select one of the keywords to be the topic, or may choose as the topic another keyword that is related in some way to the keywords on the network page 139. For example, for a page containing keywords "engagement" and "diamond ring," the page topic identifier module 124 may choose "wedding" to be the topic. Various algorithms can be used to make these choices, as should be appreciated. The page topic identifier module 124 may use a taxonomy or hierarchy in order to determine a topic. For example, the network page 139 may include the keywords "toilet" and "auger," which are listed in the taxonomy as items in the category "plumbing." Thus, the page topic identifier module 124 may identify "toilet" and "auger" as candidate topics, and then use the taxonomy to discover where the candidate topics fit into the hierarchy. The page topic identifier module 124 may then choose "plumbing" as the topic for the network page 139, rather than the candidate topics "toiler" or "auger." In some embodiments, the page topic identifier module 124 may prefer topics that are at a higher level over topics at a lower level.

In some embodiments, the page topic identifier module 124 takes into account not just the particular network page 139 identified in the call request, but other network pages previously viewed by the caller. For example, if the network page 139 identified in the call request relates to plumbing hoses, and previously viewed network pages related to washer/dryer appliances, the page topic identifier module 124 may determine that the topic of the network page 139 is washer/dryer parts rather than plumbing in general. In embodiments which take into account previously viewed network pages, the call request may also include a user identifier for the caller. The page topic identifier module 124 can then use the user identifier to obtain the caller's browse history. The browse history may be stored on the client device 106 or may be stored remotely, for example, on the Internet. If stored on the client device 106, the page topic identifier module 124 and/or the call center server 130 may request the browse history from the browser 136.

Next, at box 212, the call center server 130 uses the services of the specialist locator module 127 to identify a topic specialist based on the topic identified in box 209. In some embodiments, the specialist locator module 127 maps directly from the topic to the contact phone number for the topic specialist. In other embodiments, the specialist locator module 127 maps from the topic to the specialist, and then from the specialist to a contact phone number for the specialist. In various embodiments, the mapping function may be distributed between the specialist locator module 127 and the call center server 130.

Next, at box 215, the call center server 130 establishes a call between the client device 106 and the phone number of the identified topic specialist. At box 218, the call center server 130 notifies the topic assistance application 133 that the call has been connected. At some later point in time, at box 221 the call is terminated at the direction of either the mobile customer or the topic specialist. The process of FIG. 2 is then complete.

Figure 3:
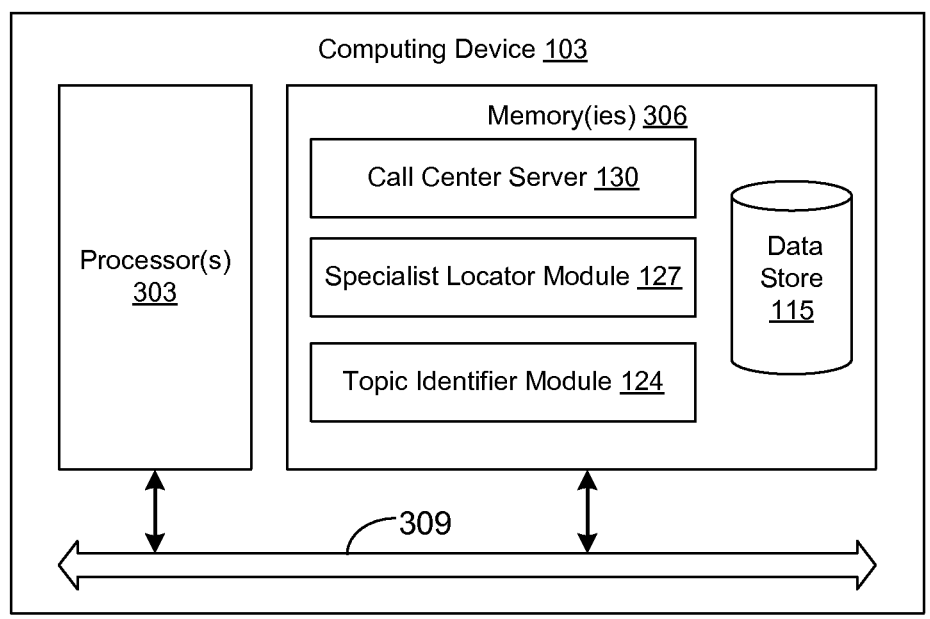
FIG. 3 is a schematic block diagram that provides one example illustration of a computing device employed in the networked environment of FIG. 1 according to various embodiments of the present disclosure.

Moving on to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the page topic identifier module 124, the specialist locator module 127, the call center server 130, and potentially other applications. Also stored in the memory 306 may be a data store 115 and other data. In addition, an operating system may be stored in the memory 306 and executable by the processor 303. While not illustrated, the client device 106 and the client device 109 also include components like those shown in FIG. 3, where by the topic assistance application 133, the browser 136, and the call agent application 142 are stored in a memory and executable by a processor.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network 112 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the page topic identifier module 124, the specialist locator module 127, the call center server 130, the topic assistance application 133, the call agent application 142, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the page topic identifier module 124, the specialist locator module 127, and/or the call center server 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including page topic identifier module 124, the specialist locator module 127, the call center server 130, the topic assistance application 133, and the call agent application 142, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable by a computing device, the program, when executed by the computing device, causing the computing device to at least:
   receive a call request from a mobile computing device, the call request including an identifier of a network page;
   retrieve the network page in response to the call request;
   identify a plurality of candidate topics for the network page based at least in part on content of the network page;
   prompt selection, in response to identifying the plurality of candidate topics, by a user of the mobile computing device of at least one of the plurality of candidate topics;
   receive a user selection of at least one of the plurality of candidate topics;
   identify a topic specialist based at least in part on the received user selection; and
   connect a call between the mobile computing device and another computing device associated with the topic specialist.

2. The non-transitory computer-readable medium of claim 1, wherein the call is selected from at least one of a voice call, a video call, or a multimedia call.

3. A computer-implemented method comprising:
   retrieving, by a first computing device, a network page in response to a call request from a second computing device, the call request including an identifier for the network page;
   identifying, by the first computing device, a plurality of candidate topics for the network page based at least in part upon content of the network page;
   prompting selection, in response to identification of the plurality of candidate topics, by a user of a second computing device of at least one of the plurality of candidate topics;
   receiving, by the first computing device, a user selection of a selected topic of the plurality of candidate topics, the selected topic received from the second computing device;
   identifying, by the first computing device, a topic specialist for the selected topic; and
   establishing, by the first computing device, a call between the second computing device and a third computing device, the third computing device associated with the topic specialist.

4. The computer-implemented method of claim 3, wherein identifying the plurality of candidate topics for the network page comprises dynamically identifying, by the first computing device, the plurality of candidate topics for the network page based at least in part upon content of the network page.

5. The computer-implemented method of claim 3, wherein identifying the topic specialist is performed in response to receiving the call request.

6. The computer-implemented method of claim 3, wherein identifying the topic specialist for the selected topic comprises identifying, by the first computing device, the topic specialist based at least in part on the plurality of candidate topics.

7. The computer-implemented method of claim 3, wherein identifying the plurality of candidate topics for the network page comprises classifying, by the first computing device, the network page into at least one of the plurality of candidate topics based at least in part on content of the network page.

8. The computer-implemented method of claim 3, further comprising:
   semantically analyzing, by the first computing device, the network page to determine one or more keywords,
   wherein identifying the plurality of candidate topics for the network page is based at least in part on the one or more keywords.

9. The computer-implemented method of claim 4, wherein dynamically identifying the plurality of candidate topics for the network page further comprises:
   analyzing, by the first computing device, the network page to determine the plurality of candidate topics;
   categorizing, by the first computing device, the plurality of candidate topics into a hierarchy; and
   causing, by first the computing device, the hierarchy associated with the plurality of candidate topics to be rendered by at least one of the first computing device, the second computing device or the third computing device.

10. The computer-implemented method of claim 3, further comprising determining, by the first computing device, a phone number associated with the third computing device.

11. The computer-implemented method of claim 3, wherein the call is selected from at least one of a voice call, a video call, or a multimedia call.

12. A system comprising:
    an electronic data store configured to store at least specific computer-executable instructions; and
    a first computing device comprising a hardware processor and in communication with the electronic data store, the first computing device configured to execute the specific computer-executable instructions to at least:
       retrieve a network page in response to a call request initiated from a second computing device on behalf of a caller, the call request including an identifier of the network page;
       identify a plurality of candidate topics for the network page based at least in part on content of the network page;

prompt selection, in response to identification of the plurality of candidate topics, by a user of the mobile computing device of at least one of the plurality of candidate topics;

receive a selection of at least one of the plurality of candidate topics from the second computing device;

identify a topic specialist based at least in part on the received selection of at least one of the plurality of candidate topics; and complete the call request by establishing a call between the first computing device and a third computing device associated with the topic specialist.

13. The system of claim 12, wherein the plurality of candidate topics for the network page is identified in response to the call request.

14. The system of claim 12, wherein identifying the plurality of candidate topics for the network page further comprises:

performing a semantic analysis on the content of the network page to determine one or more keywords; and classifying the network page into a topic based at least in part on the one or more keywords.

15. The system of claim 14, wherein the semantic analysis is performed responsive to the call request.

16. The system of claim 12, wherein identifying the plurality of candidate topics further comprises:

analyzing the network page to determine the plurality of candidate topics;

using a taxonomy to categorize the plurality of candidate topics into a hierarchy; and rendering the hierarchy associated with the plurality of candidate topics in a display associated with the computing device.

17. The system of claim 12, wherein identifying the plurality of candidate topics for the network page further comprises:

analyzing the content of the network page to determine one or more keywords;

associating individual ones of the one or more keywords with a hierarchy level, the hierarchy level comprising at least one of a product, a product category or a product subcategory; and classifying the network page into one of the plurality of candidate topics based at least in part on the one or more keywords and the hierarchy level associated with the individual ones of the one or more keywords.

18. The system of claim 12, wherein the network page at least one of a product category page, a product subcategory page, or a product detail page.

19. The system of claim 12, wherein the first computing device is further configured to execute the specific computer-executable instructions to at least map the topic specialist to a phone number.

20. The system of claim 12, wherein the call is at least one of a voice call, a video call, or a multimedia call.

* * * * *